(12) United States Patent
Johnson et al.

(10) Patent No.: US 6,978,269 B1
(45) Date of Patent: Dec. 20, 2005

(54) APPARATUS AND METHOD FOR GENERATING AND DISPLAYING A SCHEMA DIAGRAM FOR A DATABASE

(75) Inventors: Peter John Johnson, Rochester, MN (US); Michael Donald Pfeifer, Dodge Center, MN (US)

(73) Assignee: International Business Machines Corporation, Armonk, NY (US)

(*) Notice: Subject to any disclaimer, the term of this patent is extended or adjusted under 35 U.S.C. 154(b) by 808 days.

(21) Appl. No.: 09/351,793

(22) Filed: Jul. 13, 1999

(51) Int. Cl.$^7$ ............................................. G06F 17/00
(52) U.S. Cl. ..................................................... 707/100
(58) Field of Search ........................... 707/100–104.1, 707/1–10, 200–206; 345/356

(56) References Cited

U.S. PATENT DOCUMENTS

| | | | |
|---|---|---|---|
| 5,539,870 A | * 7/1996 | Conrad et al. | 395/155 |
| 5,572,650 A | * 11/1996 | Antis et al. | 395/356 |
| 6,147,687 A | * 11/2000 | Wanderski | 345/356 |
| 6,175,837 B1 | * 1/2001 | Sharma et al. | 707/103 |
| 6,189,019 B1 | * 2/2001 | Blumer et al. | 707/513 |

OTHER PUBLICATIONS

Sentissi et al., A graphical user interface for object-oriented database, 1997, IEEE, Computer Science Society, pp. 227-239.*

* cited by examiner

*Primary Examiner*—Jean M. Corrielus
*Assistant Examiner*—Joon Hwan Hwang
(74) *Attorney, Agent, or Firm*—Martin & Associates, LLC; Derek P. Martin

(57) ABSTRACT

An apparatus and method for generating and displaying a schema diagram of a database includes a schema diagrammer that automatically queries a database to determine its objects and relationships, and generates a graphical representation of the database in the form of a schema diagram that is displayed to the user. The schema diagrammer may optionally include a search filter to potentially constrain which objects and relationships in the database are included in a diagram data file, and a display filter to potentially constrain which objects and relationships stored in the diagram data file are displayed in the schema diagram.

29 Claims, 7 Drawing Sheets

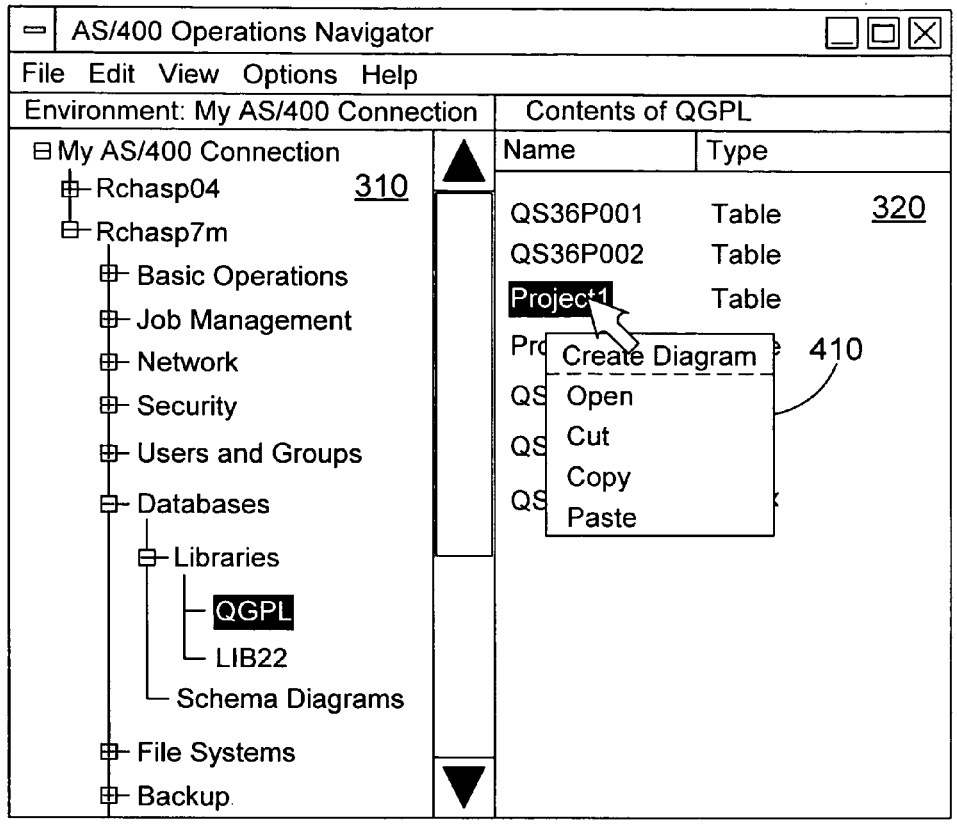
FIG. 4
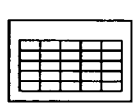  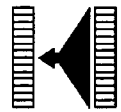 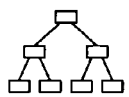 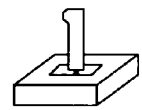
FIG. 5   FIG. 6   FIG. 7   FIG. 8   FIG. 9
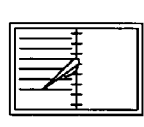 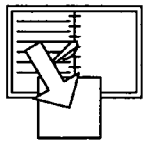 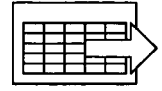 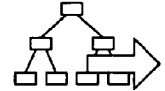 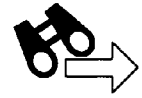
FIG. 10  FIG. 11  FIG. 12  FIG. 13  FIG. 14
   
FIG. 15  FIG. 16  FIG. 17  FIG. 18

| Menu | Menu Item |
|---|---|
| File | New Database Schema... <br> Open... <br> Save <br> Save As... <br> Print <br> Print Preview <br> Close <br> Exit |
| View | Zoom <br>     ☐ In <br>     ☐ Out <br>     ☐ To Fit Window <br>     ☐ Selected Objects <br> Refresh <br> Object Spacing <br>   Horizontal <br>     ☐ Increase <br>     ☐ Decrease <br>   Vertical <br>     ☐ Increase <br>     ☐ Decrease <br> Show Overview Window <br> Show Objects (Filters) <br>     ☒ Views <br>     ☒ Indexes <br>     ☒ Journals <br>     ☒ Journal Receivers <br>     ☒ Primary Keys <br>     ☒ Check Constraints <br>     ☒ Unique Keys <br>     ☒ Triggers <br>     ☒ Aliases <br> Arrange |
| Options | User Preferences... |
| Connection | Connect to AS/400... |

FIG. 20

| Menu | Menu Item |
|---|---|
| Diagram | Show SQL<br>☐ All Objects<br>☐ Selected Objects<br>☐ Visible Objects<br>Delete<br>Remove From Diagram<br>Create<br>☐ Table<br>☐ View<br>☐ Index<br>☐ Journal<br>☐ Trigger<br>☐ Alias<br>☐ Constraint<br>   ☐ Unique<br>   ☐ Primary<br>   ☐ Referential<br>   ☐ Check |
| Help | Help Topics<br>About Operations Navigator |

FIG. 21

APPARATUS AND METHOD FOR GENERATING AND DISPLAYING A SCHEMA DIAGRAM FOR A DATABASE

BACKGROUND OF THE INVENTION

1. Technical Field

This invention generally relates to computer systems and more specifically relates to an apparatus and method for displaying information relating to a database to a user.

2. Background Art

Since the dawn of the computer era, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Many modern computer systems are a complex combination of different hardware and software that are interconnected on a network. Networks allow computers to share information. Shared information may be stored in a central database. As the need for databases has grown, the complexity of databases has grown as well. In addition, as databases evolve over time, their structure and organization changes. The structure and organization of a database are referred to as the database "schema". The job of a database administrator is to manage and maintain a database. In order to effectively manage a database, a database administrator must know and understand the database schema. However, many database administrators have been on the job for significantly less time than the database has been running. Ofttimes, there is little or no documentation that specifies the current schema of the database. In known systems, such as the AS/400 computer system by IBM, a new database administrator may have to perform many different queries to generate a number of different lists of objects and relationships in the database. The database manager could then study the lists to determine the schema of the database. This effort is manual, time-consuming and inefficient. Without a way for a database administrator to easily generate and graphically view database schema, the computer industry will continue to suffer from inefficient tools and methods of administrating databases.

DISCLOSURE OF INVENTION

According to the preferred embodiments, an apparatus and method for generating and displaying a schema diagram of a database includes a schema diagrammer that automatically queries a database to determine its objects and relationships, and generates a graphical representation of the database in the form of a schema diagram that is displayed to the user. The schema diagrammer may optionally include a search filter to potentially constrain which objects and relationships in the database are included in a diagram data file, and a display filter to potentially constrain which objects and relationships stored in the diagram data file are displayed in the schema diagram.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 4 is a sample display of the operations manager of FIG. 3 with a context menu that allows creating a schema diagram from a selected object in accordance with the preferred embodiments;

FIGS. 5–18 each show sample icons that may be used in a schema diagram in accordance with the preferred embodiments;

FIG. 20 is a table showing which menu items are available when the File, View, Options, and Connection menu buttons on the menu bar of FIG. 19 are selected by a user; and FIG. 21 is a table showing which menu items are available when the Diagram and Help menu buttons on the menu bar of FIG. 19 are selected by a user.

BEST MODE FOR CARRYING OUT THE INVENTION

The present invention relates to generating a visual representation of a database, referred to herein as a schema diagram. According to preferred embodiments of the present invention, a user can select any object in a database and invoke a menu function to automatically generate and display a schema diagram for the database.

Figure 1:
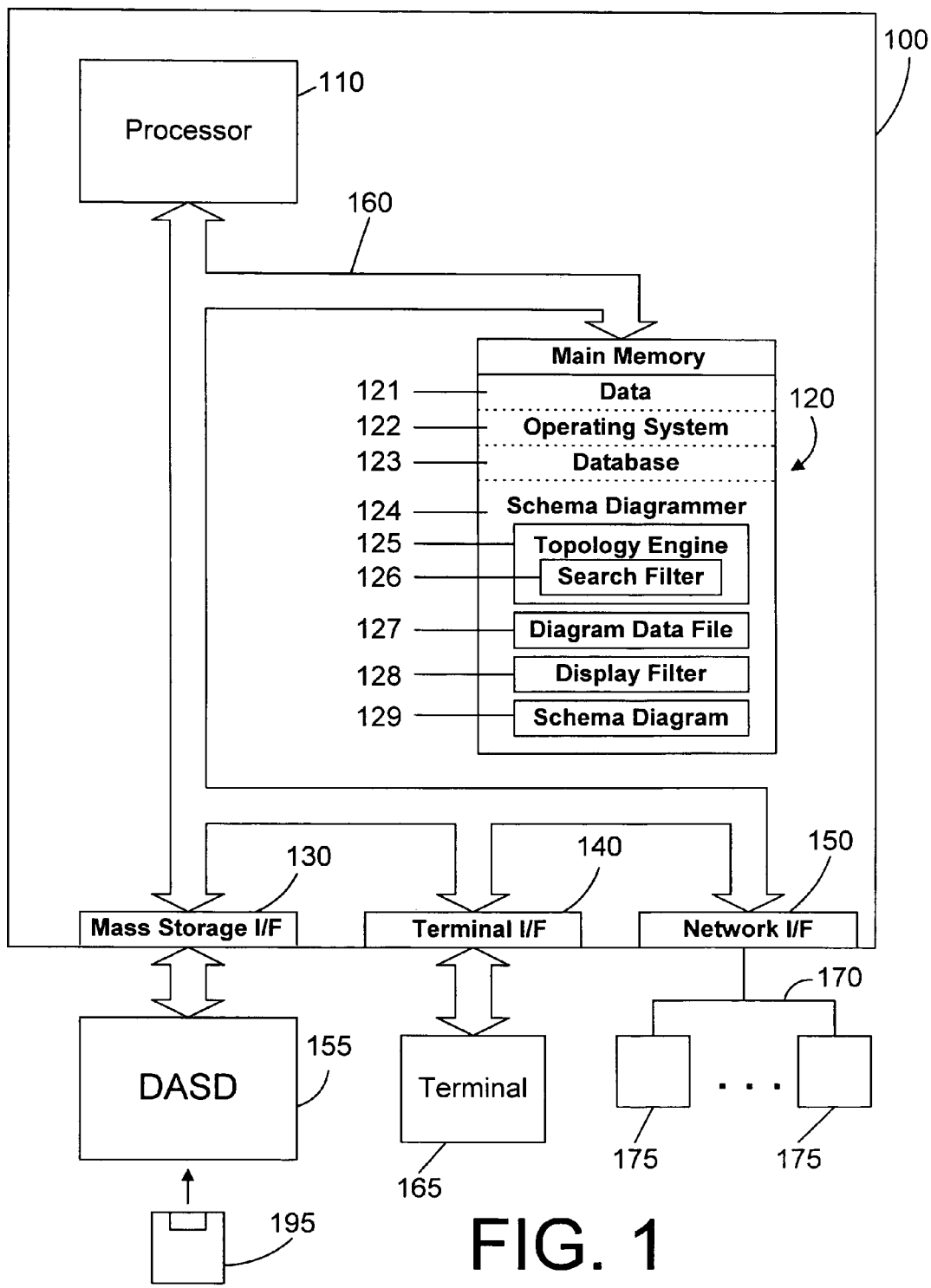
FIG. 1 is a block diagram of an apparatus in accordance with the preferred embodiments of the present invention.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 in accordance with the preferred embodiments contains data 121, an operating system 122, a database 123, and a schema diagrammer 124. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, and schema diagrammer 124 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as OS/400; however, those skilled in the art will appreciate that the spirit and scope of the present invention is not limited to any one operating system.

Database 123 is any suitable database that contains data. Examples of commonly known databases include relational databases and object oriented databases. Of course, many other types of databases are known and will be developed in the future. The present invention expressly extends to any and all types of databases, regardless of the format or structure of data within the database 123.

Schema diagrammer 124 is a computer program that determines objects and relationships that exist in database 123 and that displays a schema diagram 129 of the database to a user. Schema diagrammer 124 preferably includes a topology engine 125, a diagram data file 127, and a display filter 128 that are used to generate a schema diagram 129. Topology engine 125 is used to query database 123 to determine one or more objects and relationships that exist within database 123. In the preferred embodiments, topology engine 125 operates on a selected object in the database to find all objects and relationships that are related to the selected object. In the preferred embodiments, topology engine 125 includes a search filter 126 that determines which related objects and relationships within the database 123 are included. Search filter 126 operates according to one or more search filter criteria. For example, one suitable search filter criterion is to include only tables and views in the schema diagram with their associated relationships. In this specific example, as topology engine 125 queries database 123 to determine all objects and relationships that are related to a selected object, only those that are tables and views and their associated relationships are considered.

In the preferred embodiment, topology engine 125 stores the selected object and the related objects and relationships in a diagram data file 127. Note that search filter 126 may be configured to place all related objects and relationships into diagram data file 127, or may be configured to filter out one or more related objects and/or one or more related relationships before storing the information in the diagram data file 127.

The objects and relationships stored in diagram data file 127 are displayed to the user in a schema diagram 129. In the preferred embodiments, schema diagrammer 124 also includes a display filter 128 that may be used to filter the information stored in diagram data file 127. The display filter 128 offers the user another degree of flexibility by selectively excluding objects and/or relationships that are stored in diagram data file 127 from being displayed in the schema diagram 129. The user can thus decide whether to specify search filter criteria to constrain what is stored in diagram data file 127, whether to specify display filter criteria to constrain what portions of diagram data file 127 are displayed in schema diagram 129, or both. Of course, it is equally within the scope of the present invention to not provide any filtering, which causes all related objects and relationships to be stored in the diagram data file 127, which are then all displayed in the schema diagram 129.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
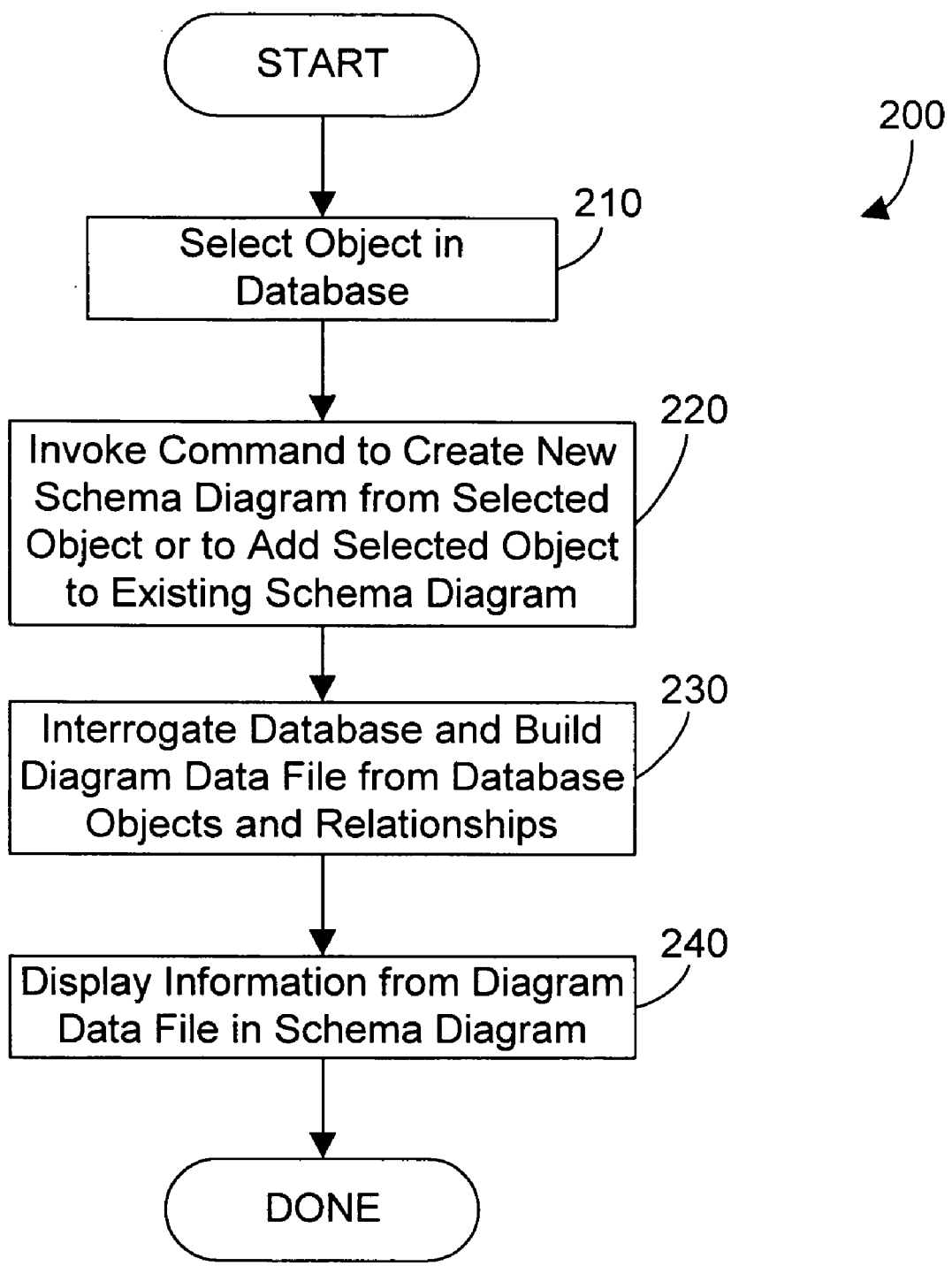
FIG. 2 is a flow diagram of a method for generating and displaying a database schema diagram in accordance with the preferred embodiments.

Referring to FIG. 2, a method 200 for generating and displaying a schema diagram to a user begins by selecting an object in the database (step 210). The selection in step 210 is suitably performed by a user selecting a graphical representation of an object in a graphical user interface, which may be accomplished by clicking on the graphical representation of the object with a pointing device (such as a mouse or trackball). Once an object is selected in step 210, the user invokes a command to create a new schema diagram from the selected object, or to add the selected object to an existing schema diagram (step 220). If no schema diagram exists, step 220 will create a new schema diagram. If a schema diagram is already being displayed the user may select to add the selected object to the schema diagram currently being displayed.

The next step is to interrogate the database to determine which objects and relationships in the database are related to the selected object (step 230). These related objects are preferably stored in the diagram data file (see 127 of FIG. 1). The data in the diagram data file 127 is then displayed as a schema diagram 129 to the user (step 240). Note that steps 230 and 240 may include filtering as discussed above with reference to search filter 126 and display filter 128. In other words, step 230 may filter what is stored in the diagram data file 127 using one or more suitable search filter criteria, and step 240 may filter portions of the diagram data file 127 from being displayed in the schema diagram 129 using one or more suitable display filter criteria.

Figure 3:
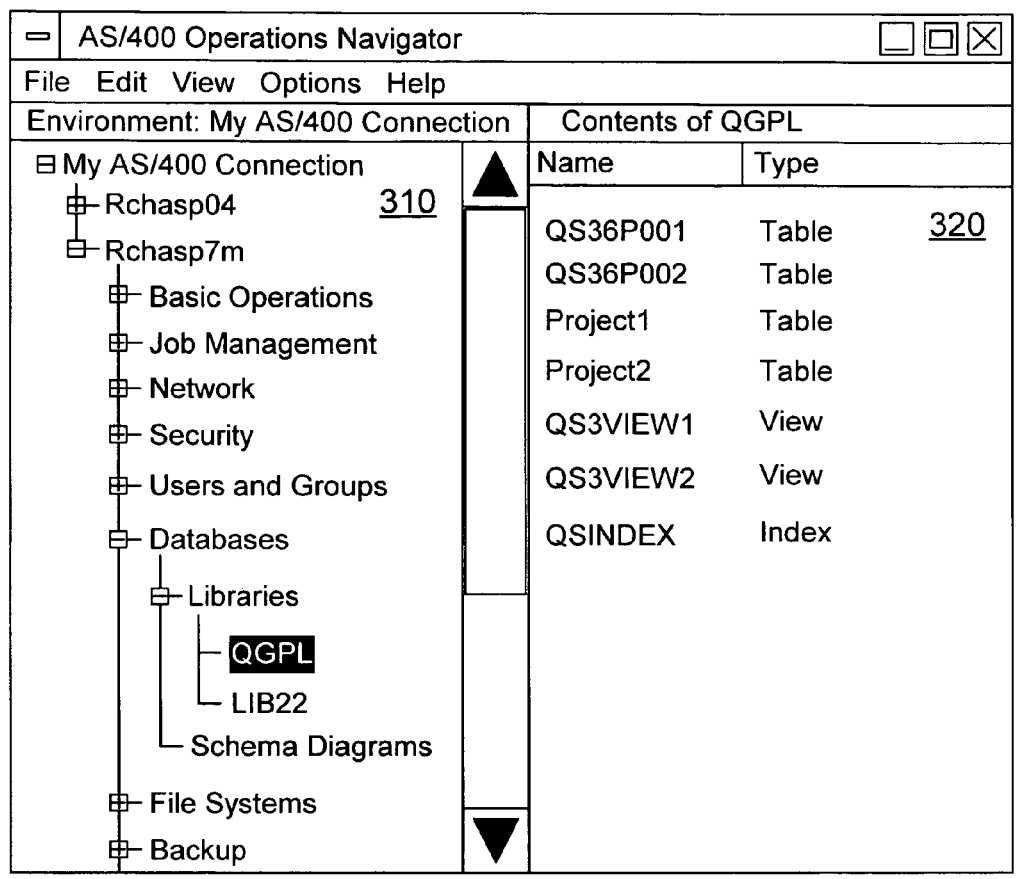
FIG. 3 is a sample display of known operations manager.

The best mode of the invention is illustrated with respect to the graphical user interface shown in FIGS. 3–21. In FIG. 3 is a prior art display of an AS/400 Operations Navigator, which contains a control window 310 on the left and a contents window 320 on the right. When a user selects one of the items in the control window 310, the contents of the selected item are displayed in the contents window 320. Thus, for the example in FIG. 3, we assume a user has selected the QGPL library (as shown by the QGPL item in the control window 310 being highlighted), which causes the contents of the QGPL library to be displayed in contents window 320. For this specific example, we assume that the QGPL library includes four tables, two views, and one index, as shown in the contents window 320 of FIG. 3.

Figure 19:
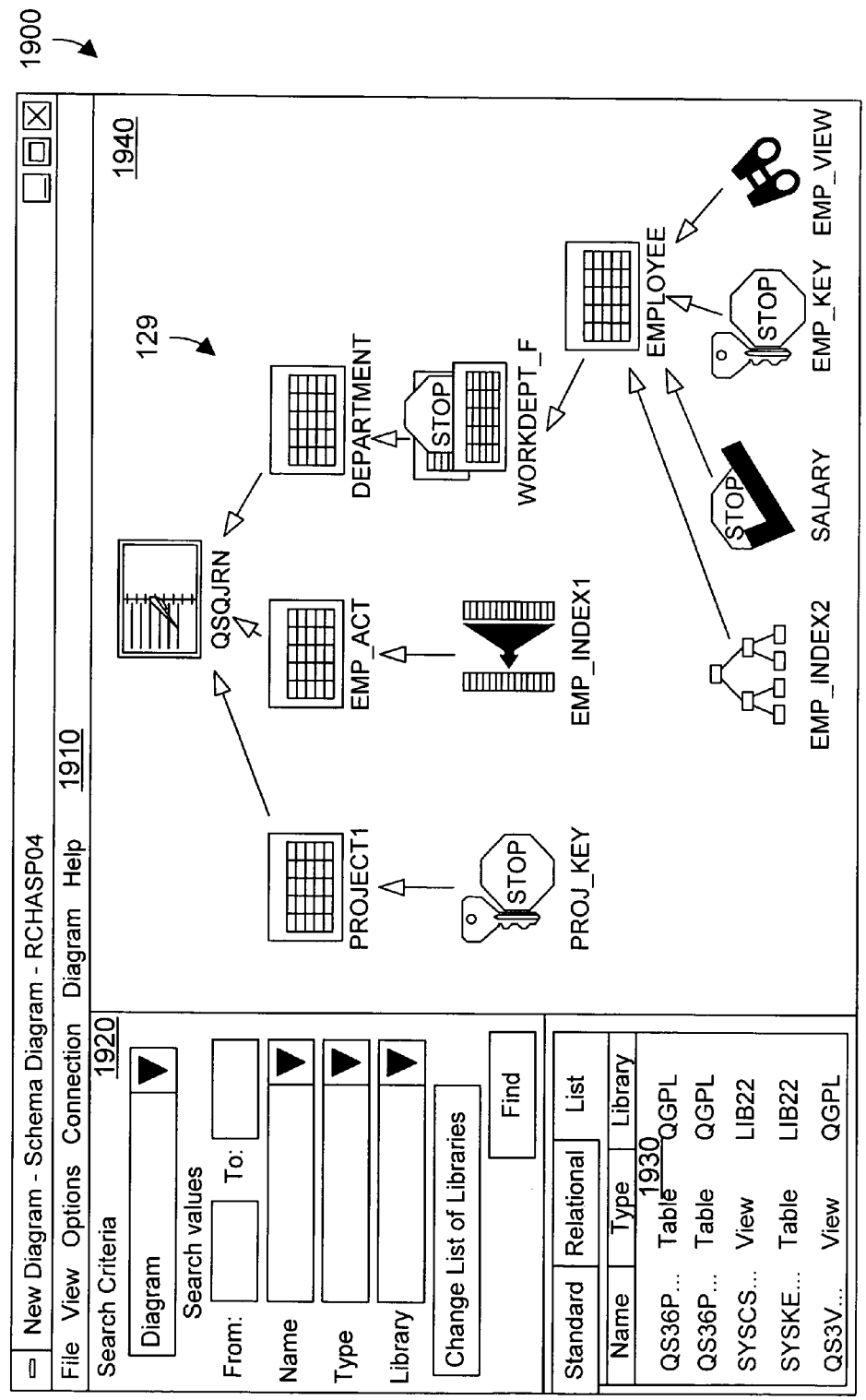
FIG. 19 is a sample display of a schema diagram in accordance with the preferred embodiments using some of the icons in FIGS. 5–18.

When a user decides to invoke the schema diagrammer 124 to generate and display a schema diagram 129, the user simply selects an object in the operations manager, and right-clicks to bring up a context menu 410, as shown in FIG. 4. In this example, the user has selected the Project1 table. Context menu 410 may include various functions, but the one of most interest in the discussion of the preferred embodiments is the Create Diagram menu item. We assume that the user selects the Create Diagram menu item in the context menu 410, which brings up a schema diagram window 1900 as shown in FIG. 19. This schema diagram window 1900 includes a menu bar 1910, a search window 1920, a search results window 1930, and a schema display window 1940.

Search window 1920 is used to search database 123 for objects and relationships. The results of a search are displayed in search results window 1930, which is shown in the example in FIG. 19 as a list display. Schema display window 1940 is a window where the schema diagram 129 is displayed to the user. The schema diagram 129 may include different icons to visually represent the various different objects and relationships that may exist in a database. Some examples of suitable icons in accordance with the preferred embodiments are shown in FIGS. 5–18. The icon in FIG. 5 represents a table in database 123. The icon in FIG. 6 represents a view. The icon in FIG. 7 represents an Encoded Vector Index (EVI), which is a type of index implementation known in the art. The icon in FIG. 8 represents a binary tree index. The icon in FIG. 9 represents a trigger. The icon in FIG. 10 represents a journal. The icon in FIG. 11 represents a journal receiver. The icon in FIG. 12 represents a table alias. The icon in FIG. 13 represents in index alias. The icon in FIG. 14 represents a view alias. The icon in FIG. 15 represents a referential constraint. The icon in FIG. 16 represents a check constraint. The icon in FIG. 17 represents a primary key. The icon in FIG. 18 represents a unique key.

The preferred embodiments encompass generating a schema diagram for any and all database objects and database relationships that are currently known or will be developed in the future. In the best mode of the invention, the database objects include: tables, indexes, views, aliases, triggers, journals, and journal receivers. The database relationships in the best mode of the invention include: referential constraints, check constraints, primary keys and unique keys. These objects and constraints are well-known in the database art, and are described in detail in "DB2 UDB for AS/400 SQL Reference", Version 4 (IBM 1999). While these objects and relationships are included in the best mode of the invention, any and all other objects and relationships in a database are expressly included within the scope of the preferred embodiments. For example, program objects, user-defined functions, trigger dependencies, user-defined data types, SQL procedures, and packages are examples of objects and relationships that are also within the scope of the preferred embodiments.

The schema diagram 129 displayed in schema display 1940 of FIG. 19 includes the Project 1 object that was selected in FIG. 4, along with the related objects and relationships in the database. The schema diagram 129 shows that the Project1 table has a PROJ_KEY unique key, and has a related journal QSQJRN. Two other tables are journaled in QSQJRN, namely EMP_ACT and DEPARTMENT. The EMP_ACT table has a related EMP_INDEX1 object. There is also an EMPLOYEE table that has a referential constraint WORKDEPT_F with the DEPARTMENT table. The EMPLOYEE table has related objects and relationships, including a binary index EMP_INDEX2, a SALARY check constraint, an EMP_KEY unique key, and an EMP_VIEW view.

The generation and display of schema diagram 129 can be controlled in various different ways within the scope of the present invention. For example, a search filter 126 may be used to constrain which objects and relationships are stored in diagram data file 127. In addition, a display filter 128 may be used to constrain which objects and relationships within the diagram data file 127 are displayed to a user. One suitable implementation of a user interface for a display filter 128 is shown in FIG. 20. FIGS. 20 and 21 show suitable menu items that are available when the user clicks on each of the menu buttons in the menu bar 1910. FIG. 20 shows that the View menu button brings up many different options for viewing the information in the diagram data file 127. A user may zoom in, zoom out, fit a schema diagram within the current window, or zoom to view selected objects. The user may change the horizontal or vertical spacing of objects in the schema diagram 129. An overview window may be selected to display all the objects in the schema diagram 129 to the user in a small window, and which allows the user to select a region of the schema diagram 129 to display in schema display window 1940. And finally, the display filter aspect of the View menu is shown by the Show Objects selections. In the example of FIG. 20, all of the objects are checked, which means that all of the diagram data file 127 will be displayed in schema diagram 129. Note, however, that a user could un-check many of the objects in FIG. 20 to filter these out, which would result in these objects not being displayed in the schema diagram 129. Note that the menu item Show Objects refers to "objects" in the generic sense in the schema diagram 129, which means any component represented by an icon in the schema diagram 129, whether it be an object or a relationship in the database.

The menu bar 1910 also includes menu buttons Options, which allows a user to set preferences for the schema diagram 129, and Connection, which allows the user to connect to another AS/400 server.

In addition to the display filter in the View menu of FIG. 20, the preferred embodiments also include a Diagram menu that allows a user to operate on the database using the schema diagram 129. The user may show the Structured Query Language (SQL) for all objects, selected objects, or visible objects, as shown by the Show SQL options in the Diagram menu. The user may delete the schema diagram 129 from the display by clicking on the Delete menu item. The user may also remove selected objects from the schema diagram by selecting one or more objects, and by then clicking on the Remove from Diagram menu item in the Diagram menu. In addition, a Create menu item allows a user to create new objects or relationships in the schema diagram. For Example, by clicking on the Table box in the Create menu item, another user interface will be presented which allows the user to define the attributes for a new table. The menu bar 1910 also preferably includes a Help button that allows a user to select help topics or to gain more information about the Operations Navigator, as shown in FIG. 21.

The present invention thus provides an apparatus and method for automatically determining objects and relationships in a database by querying the database and for constructing and displaying a schema diagram of those objects and relationships. The schema diagrammer of the present invention thus allows a database administrator to generate a visual representation of the database very quickly and efficiently, which greatly enhances the efficiency of the database administrator in performing his or her administration functions.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
at least one processor;
a memory coupled to the at least one processor;
a database residing in the memory; and
a schema diagrammer residing in the memory and executed by the at least one processor, the schema diagrammer, in response to a user selecting an object in the database, automatically determining a plurality of objects in the database that are related to the selected object and a plurality of relationships between the plurality of objects and the selected object in the database, and displaying graphically to the user a schema diagram that corresponds to at least a portion of the plurality of objects, the selected object, and at least a portion of the plurality of relationships in the database.

2. The apparatus of claim 1 wherein the schema diagrammer comprises a topology engine that automatically determines from querying the database the plurality of objects and the plurality of relationships in the database that are related to the selected object.

3. The apparatus of claim 2 wherein the topology engine generates from the selected object and the related objects and relationships a diagram data file that is used to generate the schema diagram.

4. The apparatus of claim 3 further comprising a display filter mechanism that determines what portion of the objects and relationships stored in the diagram data file are included in the schema diagram.

5. The apparatus of claim 4 wherein the display filter mechanism includes in the schema diagram all of the objects and relationships stored in the diagram data file.

6. The apparatus of claim 4 wherein the display filter mechanism includes in the schema diagram less than all of the objects stored in the diagram data file.

7. The apparatus of claim 4 wherein the display filter mechanism includes in the schema diagram less than all of the relationships stored in the diagram data file.

8. The apparatus of claim 3 further comprising a search filter mechanism that determines which of the plurality of objects the topology engine includes in the diagram data file.

9. The apparatus of claim 8 wherein the search filter mechanism further determines which of the plurality of relationships the topology engine includes in the diagram data file.

10. The apparatus of claim 1 wherein each of the plurality of objects and each of the plurality of relationships is graphically represented by a corresponding icon when included in the schema diagram.

11. The apparatus of claim 1 wherein each of the plurality of objects is independently selected from the group consisting of: table, index, view, alias, journal, journal receiver, and trigger.

12. The apparatus of claim 1 wherein each of the plurality of relationships is independently selected from the group consisting of: referential constraint, check constraint, primary key, and unique key.

13. The apparatus of claim 1 wherein the schema diagram contains less than all of the objects and relationships in the database.

14. An apparatus comprising:
at least one processor;
a memory coupled to the at least one processor;
a database residing in the memory;
a graphical user interface residing in the memory that displays at least one object in the database to a user and that allows the user to select an object in the database;
a schema diagrammer residing in the memory and executed by the at least one processor, the schema diagrammer comprising:
a topology engine that automatically determines from querying the database a plurality of objects and a plurality of relationships that are related to the selected object in the database, and that generates from the related objects and relationships and the selected object a diagram data file that is used to generate a schema diagram;
a search filter mechanism that determines which of the plurality of objects and which of the plurality of relationships the topology engine includes in the diagram data file;
a display filter mechanism that determines which of the objects and relationships stored in the diagram data file are included in the schema diagram;
each object and relationship included in the schema diagram being represented by a corresponding icon.

15. A method for graphically displaying to a user a schema diagram corresponding to a database, the method comprising the steps of:
(A) a user selecting an object in the database;
(B) invoking a command to generate and display the schema diagram;

(C) interrogating the database to determine a plurality of objects in the database that are related to the selected object and to determine a plurality of relationships in the database that are related to the selected object according to at least one search filter criterion;

(D) storing the results of step (C) in a diagram data file; and (E) displaying graphical information on the schema diagram that corresponds to at least one of the plurality of objects and at least one of the plurality of relationships in the diagram data file according to at least one display filter criterion.

16. A computer-readable program product comprising:

a schema diagrammer that, in response to a user selecting an object in a database, automatically determines a plurality of objects in a database that are related to the selected object and a plurality of relationships between the plurality of objects and the selected object in the database, and displays graphically to the user a schema diagram that corresponds to at least a portion of the plurality of objects, the selected object, and at least a portion of the plurality of relationships in the database; and recordable signal bearing media bearing the schema diagrammer.

17. The computer-readable program product of claim 16 wherein the schema diagrammer comprises a topology engine that automatically determines from querying the database the plurality of objects and the plurality of relationships in the database that are related to the selected object.

18. The computer-readable program product of claim 17 wherein the topology engine generates from the selected object and the related objects and relationships a diagram data file that is used to generate the schema diagram.

19. The computer-readable program product of claim 18 further comprising a display filter mechanism that determines what portion of the objects and relationships stored in the diagram data file are included in the schema diagram.

20. The computer-readable program product of claim 19 wherein the display filter mechanism includes in the schema diagram all of the objects and relationships stored in the diagram data file.

21. The computer-readable program product of claim 19 wherein the display filter mechanism includes in the schema diagram less than all of the objects stored in the diagram data file.

22. The computer-readable program product of claim 19 wherein the display filter mechanism includes in the schema diagram less than all of the relationships stored in the diagram data file.

23. The computer-readable program product of claim 18 further comprising a search filter mechanism that determines which of the plurality of objects the topology engine includes in the diagram data file.

24. The computer-readable program product of claim 23 wherein the search filter mechanism further determines which of the plurality of relationships the topology engine includes in the diagram data file.

25. The computer-readable program product of claim 16 wherein each of the plurality of objects and each of the plurality of relationships is graphically represented by a corresponding icon when included in the schema diagram.

26. The computer-readable program product of claim 16 wherein each of the plurality of objects is independently selected from the group consisting of: table, index, view, alias, journal, journal receiver, and trigger.

27. The computer-readable program product of claim 16 wherein each of the plurality of relationships is independently selected from the group consisting of: referential constraint, check constraint, primary key, and unique key.

28. The computer-readable program product of claim 16 wherein the schema diagram contains less than all of the objects and relationships in the database.

29. A computer-readable program product comprising:

(1) a schema diagrammer comprising:

a topology engine that automatically determines from querying the database a plurality of objects and a plurality of relationships that are related to a user-selected object in the database, and that generates from the related objects and relationships and the user-selected object a diagram data file that is used to generate a schema diagram;

a search filter mechanism that determines which of the plurality of objects and which of the plurality of relationships the topology engine includes in the diagram data file;

a display filter mechanism that determines which of the objects and relationships stored in the diagram data file are included in the schema diagram;

each object and relationship included in the schema diagram being represented by a corresponding icon; and (2) recordable signal bearing media bearing the schema diagrammer.

* * * * *